US010558700B2

(12) United States Patent
Yanashima et al.

(10) Patent No.: US 10,558,700 B2
(45) Date of Patent: Feb. 11, 2020

(54) DISPLAY SYSTEM, DISPLAY METHOD IN THE SYSTEM AND DISPLAY PROGRAM FOR USING SOCIAL GRAPH INFORMATION OF USERS OF MULTIPLE APPLICATIONS

(71) Applicant: GREE, INC., Tokyo (JP)

(72) Inventors: Ryoji Yanashima, Tokyo (JP); Yoshinobu Kinugasa, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/020,281

(22) Filed: Jun. 27, 2018

(65) Prior Publication Data

US 2018/0373709 A1     Dec. 27, 2018

Related U.S. Application Data

(63) Continuation of application No. 14/419,498, filed as application No. PCT/JP2013/071270 on Aug. 6, 2013, now Pat. No. 10,037,325.

(30) Foreign Application Priority Data

Aug. 6, 2012    (JP) ................................ 2012-174341

(51) Int. Cl.
*G06F 15/16*     (2006.01)
*G06F 16/438*     (2019.01)
(Continued)

(52) U.S. Cl.
CPC .......... *G06F 16/438* (2019.01); *A63F 13/795* (2014.09); *A63F 13/79* (2014.09)

(58) Field of Classification Search
USPC ........................................................ 709/206
See application file for complete search history.

(56) References Cited

U.S. PATENT DOCUMENTS 7,199,837 B2 *   4/2007   Callway ................. G09G 5/006
                                                                          348/581
7,677,970 B2 *   3/2010   O'Kelley, II ......... A63F 13/795
                                                                          463/23

(Continued)

FOREIGN PATENT DOCUMENTS

JP        2003-196420        7/2003
JP        2006-158956 A    6/2006
(Continued)

OTHER PUBLICATIONS

Office Action dated Mar. 28, 2017 in Japanese Patent Application No. 2014-529514.
(Continued)

*Primary Examiner* — Alicia Baturay
(74) *Attorney, Agent, or Firm* — Oblon, McClelland, Maier & Neustadt, L.L.P.

(57) ABSTRACT

When retrieving information relating to another user of a different SNS, the CVR of an SNS can be effectively increased by displaying a social graph. According to the invention, by means of a social graph display program (API), user identifying information corresponding to user-to-user relationship information meeting predetermined conditions can be extracted by searching a database of information related to the other users of application programs A-C, in accordance with identifying information of a user A who has made a friend request. Thus the application program A displays, as candidates for the friend request, users corresponding to user identifying information returned from the social graph display program (API).

15 Claims, 11 Drawing Sheets

(51) Int. Cl.
*A63F 13/795* (2014.01)
*A63F 13/79* (2014.01)

(56) References Cited

U.S. PATENT DOCUMENTS

| | | | | |
|---|---|---|---|---|
| 7,970,712 | B2* | 6/2011 | Ruvolo | G06Q 50/01 705/1.1 |
| 8,221,238 | B1* | 7/2012 | Shaw | A63F 13/79 463/29 |
| 8,366,546 | B1* | 2/2013 | Naik | A63F 13/12 463/31 |
| 8,388,446 | B1* | 3/2013 | Craine | A63F 13/48 463/42 |
| 8,425,331 | B2* | 4/2013 | Bortnik | A63F 13/12 463/43 |
| 8,535,165 | B2* | 9/2013 | O'Kelley | A63F 13/12 463/42 |
| 8,585,501 | B2* | 11/2013 | Shaw | A63F 13/12 463/42 |
| 8,849,912 | B2* | 9/2014 | Aonuma | A63F 13/71 709/204 |
| 9,292,882 | B2* | 3/2016 | Blinder | G06Q 30/02 |
| 9,375,641 | B2* | 6/2016 | Shaw | A63F 13/537 |
| 9,824,540 | B2* | 11/2017 | Webb | G07F 17/3258 |
| 10,037,325 | B2 | 7/2018 | Yanashima | A63F 13/795 |
| 2006/0135264 | A1* | 6/2006 | Shaw | A63F 13/795 463/42 |
| 2012/0136565 | A1 | 5/2012 | Kennedy et al. | |
| 2014/0006517 | A1* | 1/2014 | Hsiao | G06Q 50/01 709/205 |
| 2018/0296929 | A1* | 10/2018 | Vaccari | H04L 51/063 |

FOREIGN PATENT DOCUMENTS

| | | |
|---|---|---|
| JP | 2009-511200 A | 3/2009 |
| JP | 2009-146315 | 7/2009 |
| JP | 2010-066814 | 3/2010 |
| JP | 2010-146415 | 7/2010 |
| JP | 2011-503677 A | 1/2011 |
| JP | 2012-14700 A | 1/2012 |
| JP | 2012-27738 A | 2/2012 |
| JP | 2012-88856 A | 5/2012 |

OTHER PUBLICATIONS

Japanese Office Action dated Nov. 22, 2016 in patent application No. 2015-20825.

Youichirou Tanaka "OpenSocial nyumon—Sosyaru apurikesyon no zissen kaihatsu—Google ga egaku SNS no miraikei" Guutsu-Hyohron Co., Ltd., Jan. 25, 2009, pp. 128-143, 167-171, and 228-256 with partial English translation.

International Preliminary Report on Patentability and Written Opinion dated Feb. 10, 2015 in PCT/JP2013/071270.

Japanese Office Action dated Mar. 31, 2015 in Patent Application No. 2014-529514 (with English translation), 6 pages.

Japanese Office Action dated Aug. 25, 2015 in Patent Application No. 2014-529514 (with English translation), 4 pages.

Japanese Office Action dated Feb. 1, 2016 in Patent Application No. 2014-529514 (with English translation), 4 pages.

Japanese Office Action dated Nov. 22, 2016 in Patent Application No. 2014-529514 (with English translation), 34 pages.

Japanese Office Action dated Mar. 28, 2017 in Patent Application No. 2014-529514, (submitting English translation only, reference previously filed) 20 pages.

Japanese Office Action dated Nov. 1, 2016 in Patent Application No. 2015-228785 (with English translation), 7 pages.

Youichirou Tanaka "OpenSocial nyumon—Sosyaru apurikesyon no zissen kaihatsu—Google ga egaku SNS no miraikei" Gijutsu-Hyohron Co., Ltd., Jan. 25, 2009, pp. 128-143, 167-171, and 228-256 with partial English translation.

International Search Report dated Nov. 12, 2013 in PCT/JP13/071270 filed Aug. 6, 2013.

\* cited by examiner

DISPLAY SYSTEM, DISPLAY METHOD IN THE SYSTEM AND DISPLAY PROGRAM FOR USING SOCIAL GRAPH INFORMATION OF USERS OF MULTIPLE APPLICATIONS

CROSS REFERENCE TO RELATED APPLICATIONS

This application is a continuation of U.S. application Ser. No. 14/419,498, filed on Jun. 15, 2015, and is based upon and claims the benefit of priority to International Application No. PCT/JP13/071270, filed on Aug. 6, 2013 and from the prior Japanese Patent Application No. 2012-174341 filed on Aug. 6, 2012. The entire contents of each of these documents are incorporated herein by reference.

TECHNICAL FIELD

The present invention relates to a display system and to a display method and a display program in the same system.

BACKGROUND

In recent years, social networking service (hereinafter, referred to as "SNS") technologies have been widely used as represented by Twitter (Registered Trademark), Facebook (Registered Trademark), and the like. In such an SNS, for example, users can exchange messages such as in chats or the like and establish friend relationships on the network. Thereby, connections between the users are created. Under such circumstances, in recent years, it is well known that the concept of a social graph to depict such connections between users has been proposed in Facebook.

As represented by Facebook described above, such a social graph is constructed by behavior of users in a predetermined SNS in general. A technology of collecting social graph information through different web services, creating a synthetic social graph from the collected social graph information, and delivering the social graph has been disclosed (Patent Document 1).

Moreover, in recent years, an operating environment (application platform) such as an application program interface (API) to be operated on a web browser has been provided onto an SNS. Application software created with this as platforms are collectively referred to as social applications, and games in the social applications are referred to as social games.

In particular, social games do not require dedicated client software but can be played with only a web browser and an account of an SNS, and the most remarkable characteristics of social games include combination with the original communication function of an SNS. The games themselves are mainly easily playable in a short period of time not only on a personal computer but also on a feature phone, a smart phone, and the like.

PRIOR ART DOCUMENTS

Patent Documents

Patent Document 1: Japanese Laid-Open Patent Publication No. 2010-146415

SUMMARY

However, in Patent Document 1, social graph information of the same user in other web services including different SNSs cannot be retrieved. In an SNS, an increase in a conversion rate (CVR), which indicates an increase in users who use the SNS, is important. However, conventionally, there is no system capable of retrieving the social graph information of the same user, including different SNSs. Thus, users who use the SNS cannot efficiently be increased.

The same applies to service platforms including a plurality of game applications. There has been no system that retrieves social graph information of the same user in a plurality of game applications.

Accordingly, it is an objective of the present invention to provide a display system capable of efficiently increasing the CVR of an SNS by retrieving information on a relationship with other users of a service platform including a plurality of application programs or user information of other users, extracting identifying information of the retrieved information on the relationship with other users or the retrieved user information of other users, and displaying social graph information corresponding to the extracted identifying information of other users on a client terminal, and to provide a display method and a display program in the same system.

In accordance with the first invention of the present disclosure, a display system is provided that includes: a storage device that is managed for each of application programs and stores, in association, at least either information on a relationship with another user or information relating to use of a corresponding application program; a means that, in response to a predetermined event request from the application program, retrieves the information on the relationship with another user or the information relating to the use of the corresponding application program, the information meeting a predetermined condition corresponding to identifying information of a user who has made the predetermined event request regarding the application programs of the storage device, and extracts another user identifying information of the retrieved information on the relationship with another user or the retrieved information relating to the use of the corresponding application program; and a means that returns the extracted another user identifying information to the application program from which the predetermined event request has been made, thereby displaying information corresponding to the extracted another user identifying information on a client terminal of the user who has made the predetermined event request.

According to the present invention, the CVR of an SNS is efficiently increased by retrieving the information on the relationship with other users of the service platform including a plurality of application programs or the user information of other users, extracting the identifying information of the retrieved information on the relationship with other users or the retrieved user information of other users, and displaying the information corresponding to the extracted identifying information of other users on the client terminal.

DETAILED DESCRIPTION

One embodiment of the present invention will now be described with reference to the drawings.

Hereinafter, with reference to the drawings, a social graph display system according to the embodiment of the present invention will be described.

Figure 1:
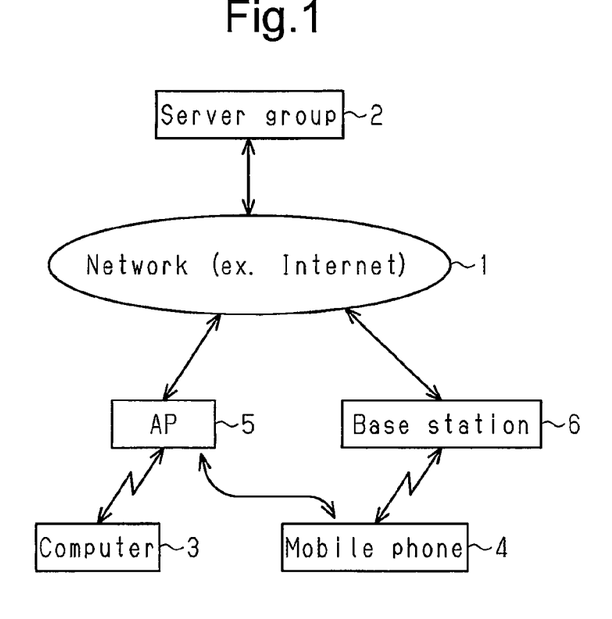
FIG. 1 is a diagram for illustrating an environment in which a social graph display system according to one embodiment of the present invention is used.

FIG. 1 is a diagram for illustrating an environment in which the social graph display system according to the embodiment of the present invention is used.

As shown in the drawing, in a network 1 such as the Internet, a server group 2 and a computer 3 and a mobile phone 4 that use the social graph display system according to the embodiment of the present invention are connected to the network 1 via an access point 5 or a base station 6.

The server group 2 is a computer for realizing the social graph display system according to the embodiment of the present invention, and may be realized by one computer or may be formed by a plurality of computers such as a web server, a processing server, and a database server for each of the functions thereof, and in the embodiment of the present invention, may be formed in any form.

The computer 3 includes a general desktop computer as well as a mobile computer, a laptop computer, and a tablet type terminal.

The mobile phone 4 includes a smart phone and a feature phone, and serves as a mobile phone to be operated on an operating system such as Android (Registered Trademark) and iOS (Registered Trademark), for example.

Figure 2:
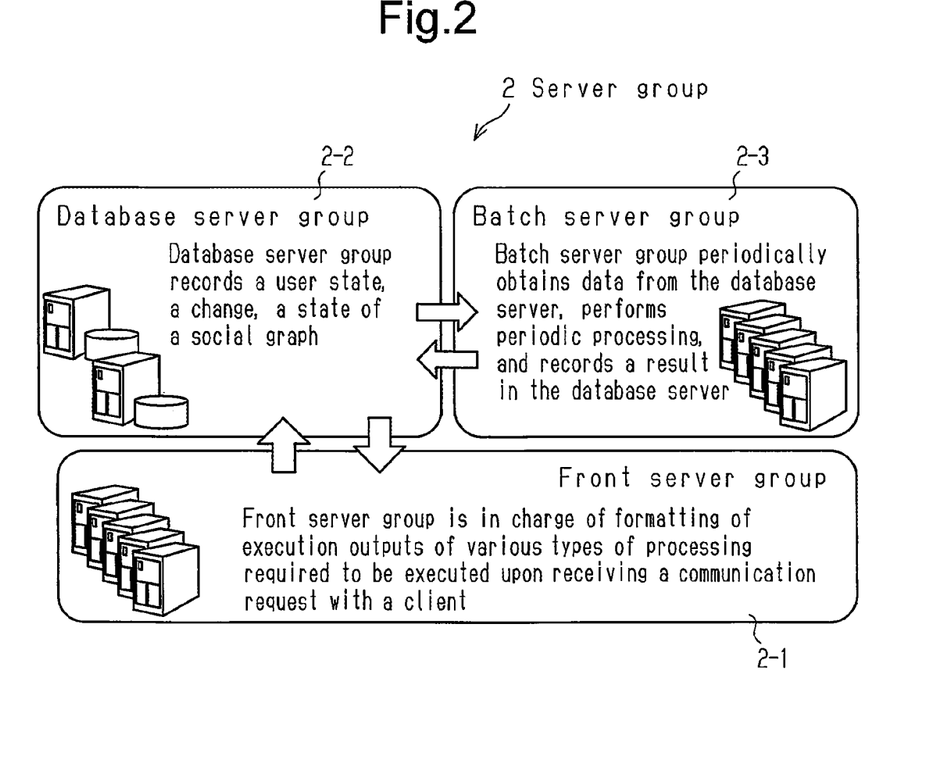
FIG. 2 is a diagram showing one example of a configuration of a server group 2 in the embodiment of the present invention.

FIG. 2 is a diagram showing one example of the configuration of the server group 2 in the embodiment of the present invention.

As shown in the drawing, for example, the server group 2 is formed by a front-end server group 2-1, a database server group 2-2, and a batch server group 2-3.

The front-end server group 2-1 is in charge of formatting of execution outputs of various types of processing that can be executed upon receiving a request for communication with a client. For example, a web server and the like are included.

The database server group 2-2 records user identifying information, user information, changes, social graph information, and the like. For example, the database server group 2-2 is a processing server that performs core processing of social networking service processing.

The batch server group 2-3 periodically obtains data from the database server group 2-2, performs periodic processing, and records the results in the database server group 2-2.

In the present embodiment, to facilitate illustration, a case where operations are performed on one server 10 will be described. However, as described above, a configuration of the server is not limited to this.

Figure 3:
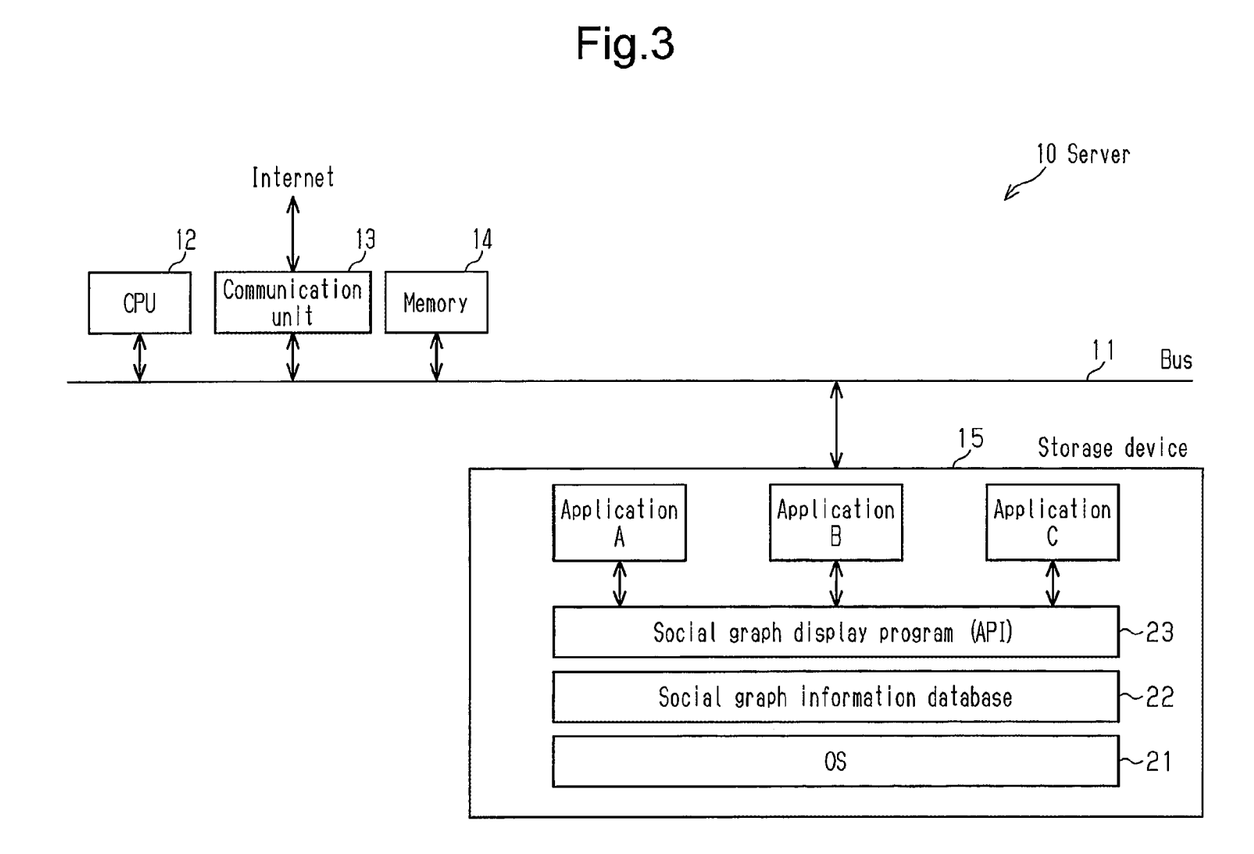
FIG. 3 is a diagram showing a configuration of a server 10 that performs operations of the social graph display system according to the embodiment of the present invention.

FIG. 3 is a diagram showing the configuration of the server 10 that performs the operations of the social graph display system according to the embodiment of the present invention.

As shown in the drawing, the server 10 has a bus 11 to which a CPU 12, a communication unit 13, a memory 14, and a storage device 15 are connected.

The CPU 12 works together with a social graph display program (API) 23 according to the embodiment of the present invention that is stored in the storage device 15, to perform social graph display processing according to the embodiment of the present invention as well as handling control of the entire server 10.

The communication unit 13 handles the control of communication with external devices such as clients via the network 1.

The memory 14 is used as a work area or the like required at the time of executing the social graph display program (API) 23.

The storage device 15 stores programs required for the social graph display processing and data, and is, for example, a high-capacity storage device such as a hard disk drive (HDD), an optical disc drive, a DVD, and magneto-optic (MO) disk. The storage device 15 stores an operating system (OS) 21, a social graph information database 22, and the social graph display program (AN) 23.

The OS 21 is a program for realizing basic functions of the server 10.

The social graph information database 22 manages the data used in the social graph display processing operated by the social graph display program (API) 23. In the present embodiment, the identifying information of the user is managed for each application program (application program ID), and user-to-user relationship information is managed for each piece of identifying information of the user.

In addition, although the case has been described in which the identifying information of the user is managed for each application program and user-to-user relationship information is managed for each piece of identifying information of the user, the present invention is not limited to this. For example, the identifying information of the user may be managed for each piece of user-to-user relationship information and the application program may be managed for each piece of identifying information of the user.

Figure 4:
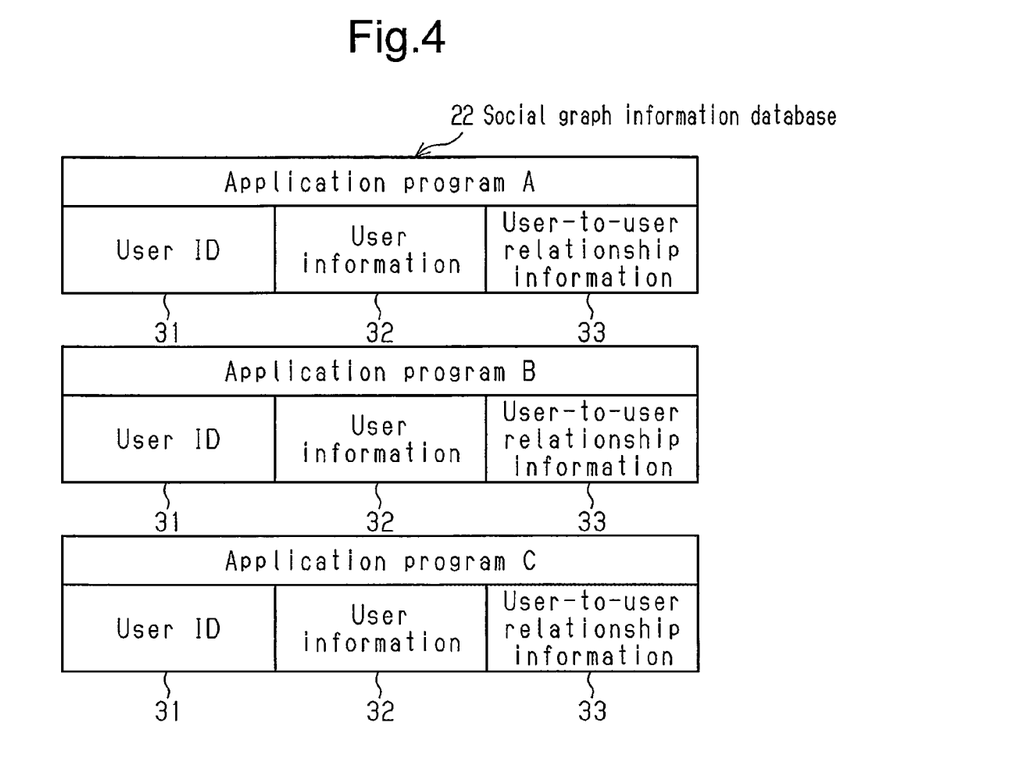
FIG. 4 is a diagram showing social graph information database 22.

FIG. 4 is a diagram showing the social graph information database 22. As shown in the drawing, user identifying information 31, user information 32, and user-to-user relationship information 33 are managed for each of application programs A to C.

The "user identifying information 31" is identifying information commonly used in the application programs A to C. Therefore, the same user identifying information displays the same user, and the user information 32 and user-to-user relationship information 33 thereof are held for each of the application programs A to C.

The "user information 32" is information relating to an individual attribute of the user or use of a predetermined application. For example, when the application program A is a social networking game, the user information is the user level, items, the number of coins, the number of medals, cards, and the like. The user information sometimes becomes an object of retrieval at the time of displaying a social graph.

The user information 32 can include the following information, for example.

The user level of other users of a corresponding application program, the user level to be set for each application program Total game playing time of other users of a corresponding application program, the time to be set for each application program (for example, one day, one week, one month)

Game start time points of other users of a corresponding application program, the time points to be set for each application program (for example, the game was started in September 2012)

Game hours of other users of a corresponding application program, the hour to be set for each application program (for example, 10:00 to 14:00 on weekdays)

Charging timing of other users of a corresponding application program, the timing to be set for each application program (for example, one day, one week, one month)

Completion rate of other users of a corresponding application program, the rate to be set for each application program (for example, quest completion rate and the number of boss beating characters)

Corresponding desired item list to be set for each application program (for example, particular SSR cards registered in a wish card list in a card game)

The number of times of posting of other users to the same message board as that of the user, the number to be set for each application program Regional information, birthday, age, gender, hobbies, blood type, Chinese astrological zodiac sign, and profile image post of other users to be set for each application program The number of footprints of other users who is a friend of the user, the number to be set for each application program History information to be set for each application program such as a news article, column, and the like of other users (for example, in the fields of gourmet, shopping, beauty, sports, leisure, media, entertainment, living, life, school, public service, and the like)

Ranking of other users of a corresponding application program, the ranking to be set for each application program Game genre registration number of My Game of other users, the number to be set for each application program (for example, the registration number of two for a role-playing game). In addition, the game genre includes, for example, dating, training/simulation, board, card, sports, racing, action, timing, puzzle, adventure, education/quiz, gambling, and the like)

Avatar use rate of other users to be set for each application program

Figure 5:
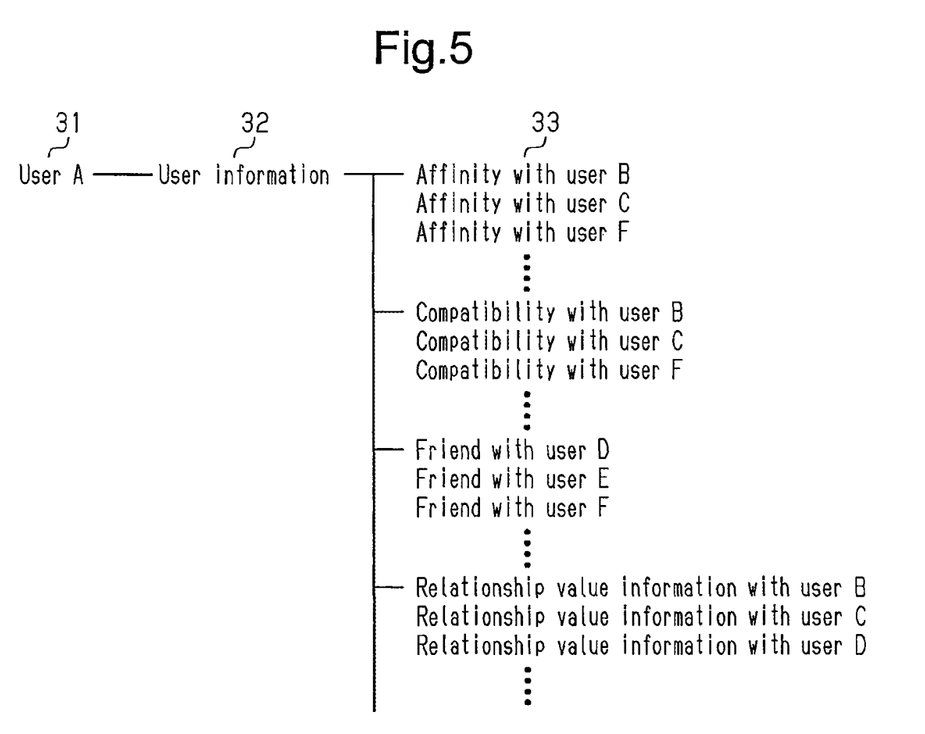
FIG. 5 is a diagram for illustrating social graph information.

The "user-to-user relationship information 33" is information serving as an object of retrieval at the time of displaying the social graph, the information on a relationship with other users. For example, as shown in FIG. 5, information such as "affinity," "compatibility," and "friend" with other users may serve as the user-to-user relationship information.

"Affinity" is determined for each user, for example, by the number of times of a conversation (chats or the like) with a user A. "Compatibility" is determined for each user, for example, by a character attribute of the user, items, and the like. Regarding "friend," a user who approves a friend request from the user A or who makes a friend request to the user A, the request having been approved by the user A is a "friend." In addition, the examples described above are only one example. The user-to-user relationship information is not limited to this as long as the information displays the relationship with other users. For example, the case has been described in which after a user who makes a friend request to the user A, the request having been approved by the user A is a "friend." However, even when the request is not approved, he/she may become a "friend." In this case, definition of the friend between the users is calculated with use of a threshold value (indicating a relationship between the affinity and the compatibility) determined on the server in advance, and friend approval is made. Since the relationship between the affinity and the compatibility regards calculation on the server, description thereof will be omitted here.

In such a way, a user is retrieved through the application programs based on at least one piece of the user-to-user relationship information and the user information, so that the social graph can be displayed. Thus, the CVR of the application programs can be improved. In addition, for example, as shown in FIG. 5, the user-to-user relationship information for each application program may have "relationship value information" and the user identifying information may be extracted based on this relationship value information. The relationship value information is information on the relationship between the user and other users.

Figure 10:
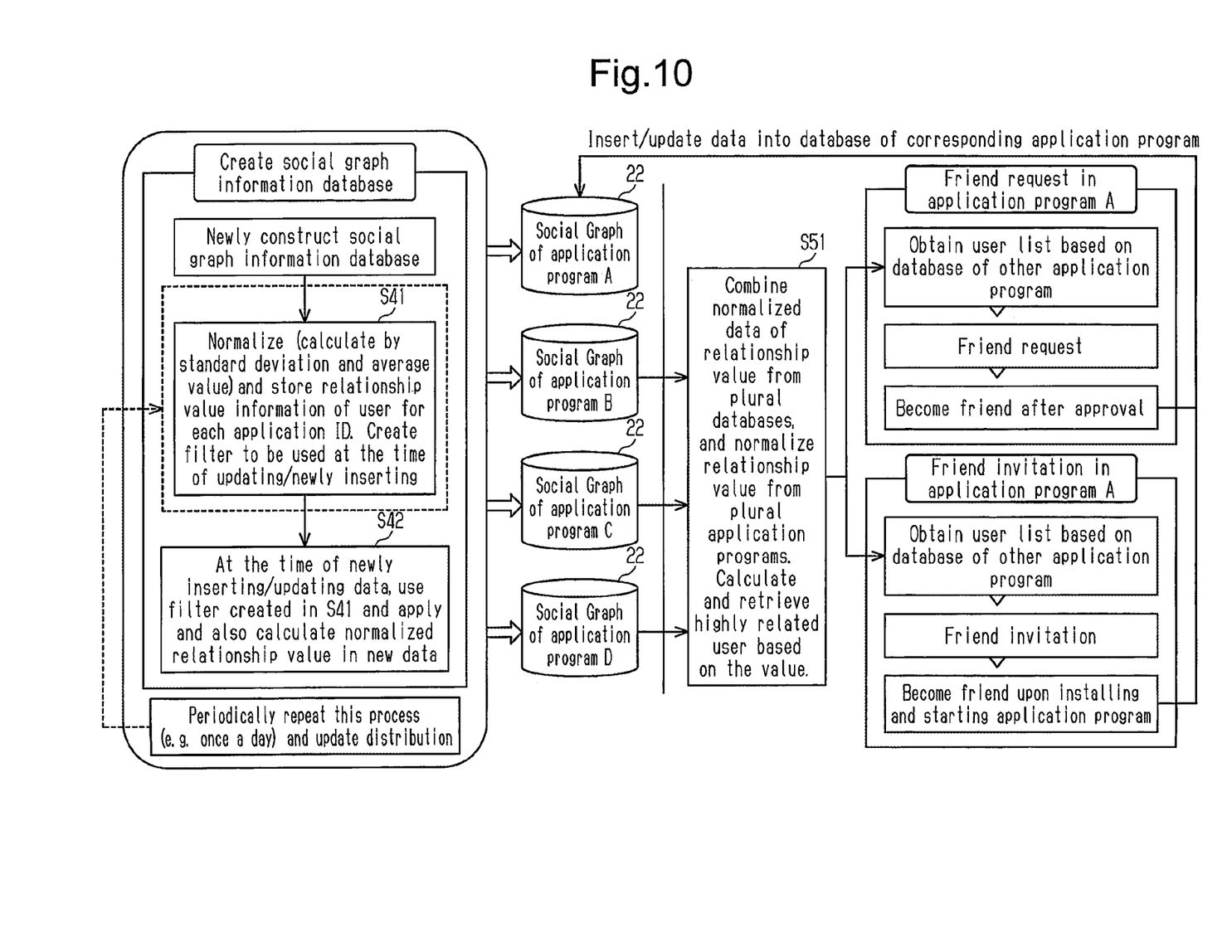
FIG. 10 is a diagram for illustrating creation of relationship value information of the social graph information database and the like in the social graph display system according to the present embodiment.

This "relationship value information" is calculated by combining parameters (user information, user-to-user relationship information (such as affinity with other users, compatibility, the number of friends, the number of times of trading, the number of times of requests, and the number of times of e-mailing)) of the user for each application program (application program ID). For example, the relationship value information is calculated by multiplying each of the parameters by a predetermined coefficient. Next, this relationship value information is normalized (calculated by standard deviation and an average value) and stored. Next, a distribution of the calculated relationship value information is obtained and the relationship value information in the same application program is normalized. Next, based on the normalized relationship value information, a filter for obtaining the relationship value information at the time of inserting and changing the data is created (S41). In addition, processing of S41 is periodically repeated (for example, once a day) and the distribution of the relationship value information is updated.

At the time of inserting/updating the user data (user ID, user information, user-to-user relationship information), the filter created in S41 is used and various types of data are converted into data normalized in accordance with the distribution of the relationship value information (S42). Then, based on this converted data, the normalized relationship value information is stored in S41.

In addition, although the case has been described in which the normalized relationship value information is stored in S41, the normalized relationship value information may be stored or recorded.

The user data is inserted/updated, for example, as shown in FIG. 10, in a case where the friend request is approved in the application program A or a friend invitation in the application program A is made to a user in another application and the invited user starts the application A.

In addition, the relationship value information stored in the database 22 of each of the application programs is combined for each user and normalized (S51). Then, based on this normalized relationship value information, highly related users having the relationship value information meeting a predetermined condition are retrieved.

The social graph display program 23 is an API of the application programs A to C, and works together with the CPU 12 so as to realize the social graph display processing according to the embodiment of the present invention.

Next, construction of the relationship value information included in the user-to-user relationship information of the social graph information database 22 will be described with reference to FIG. 10.

First, in a case where the social graph information database 22 is newly constructed, the user ID, the user information 32, and the user-to-user relationship information 33 are constructed for each application program as shown in FIG. 4.

Among the above, the relationship value information included in the user-to-user relationship information 33 is calculated by combining parameters (user information, user-to-user relationship information (such as affinity with other users, compatibility, the number of friends, the number of times of trading, the number of times of requests, and the number of times of e-mailing)) of the user for each application program (application program ID). This calculated relationship value information is normalized (calculated by standard deviation and an average value) and stored.

Figure 6:
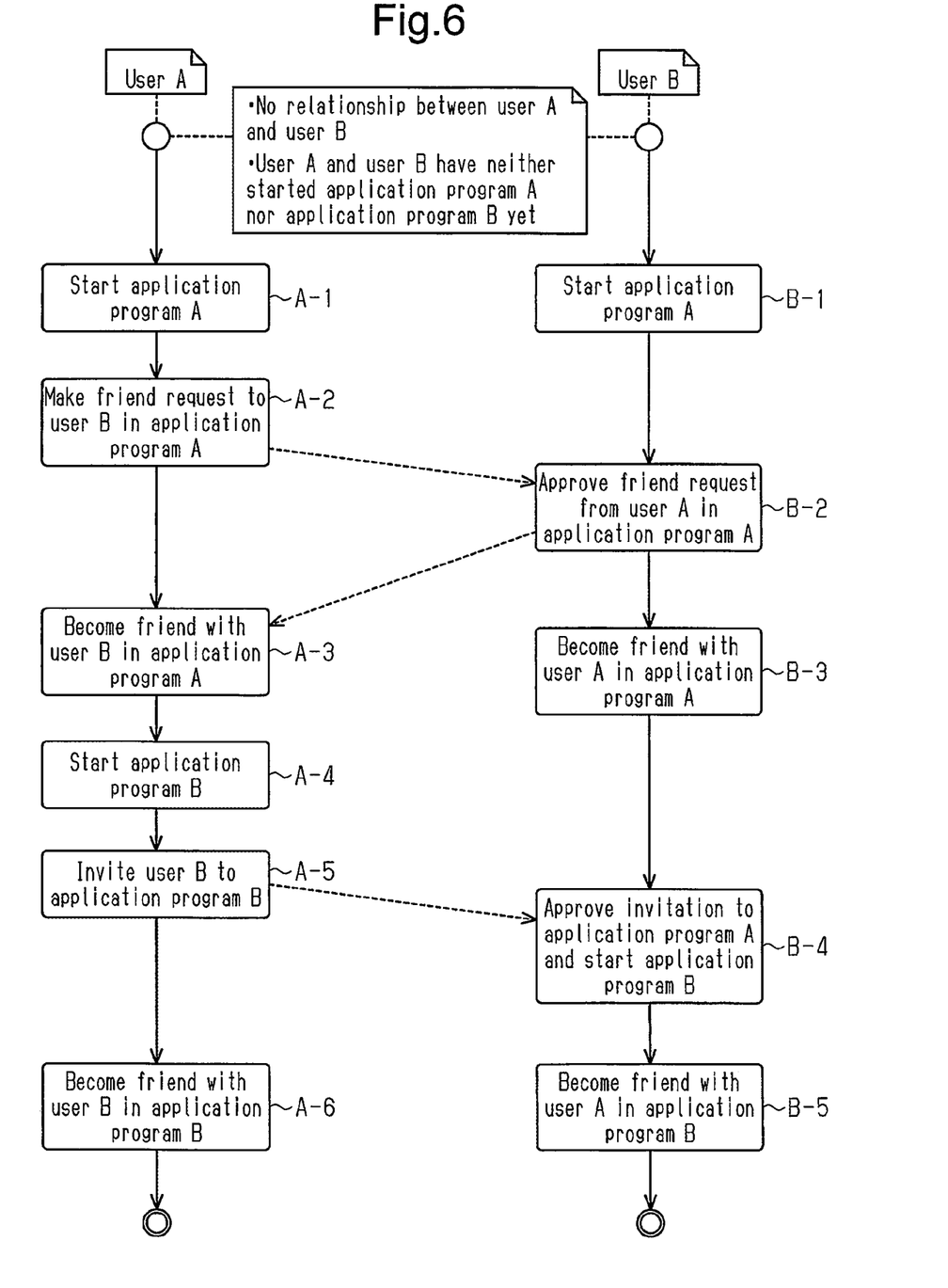
FIG. 6 is a flowchart for illustrating social graph display processing.

Next, the social graph display processing related to a friend request in the social graph display system according to the embodiment of the present invention will be described with reference to a flowchart of FIG. 6.

In addition, the description will begin from a state where there is no relationship between the user A and the user B and the user A and the user B have neither started the application program A nor the application program B yet.

First, both of the user A and the user B start the application program A (Steps A-1, B-1). Next, the user A makes a friend request to the user B in the application program A (Step A-2).

Figure 7:
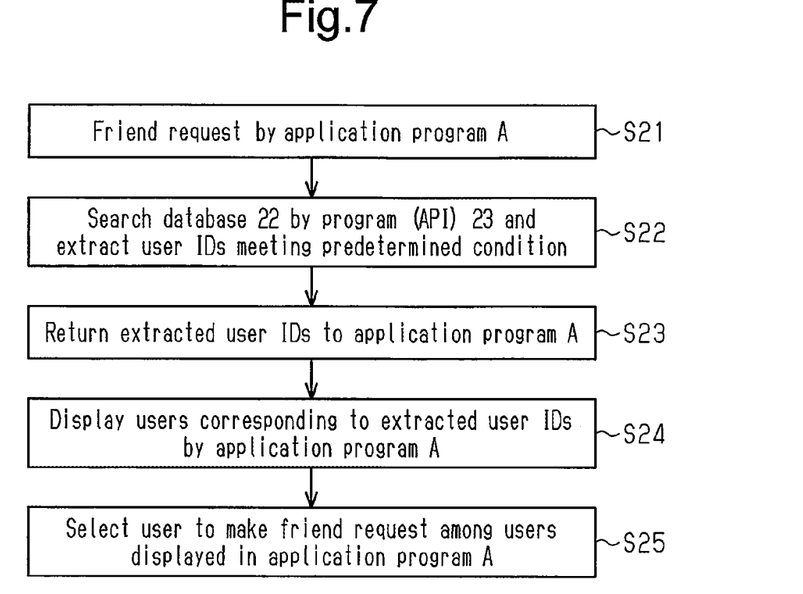
FIG. 7 is a flowchart for illustrating processing by a social graph display program (API) 23 and an application program A in a case of making a friend request.

In a case where the friend request is made, processing shown in FIG. 7 is performed by the social graph display program (API) 23 and the application program A.

That is, when a friend request is made by the application program A (S21), the social graph display program (API) 23 searches the social graph information database 22 of the application programs A to C based on the identifying information of the user A, who has made the friend invitation, retrieves the social graph information meeting a predetermined condition, and extracts the user identifying information of the retrieved social graph information (S22).

The "predetermined condition" is, for example, to sort in the order of high "affinity" (the number of times of a conversation) and extract the user identifying information within a fixed range or the like. The "predetermined condition" may be set by combining a plurality of pieces of user information, may be set by combining the user information and the user-to-user relationship information, or may be calculated by performing some processing.

In a case where the friend request is made based on the relationship value information, the relationship value information stored in the database 22 of each of the application programs is combined for each user and normalized. Then, based on this normalized relationship value information, the highly related users having the relationship value information meeting the predetermined condition are retrieved.

Next, the social graph display program (API) 23 returns the extracted user identifying information to the application program A (S23), and the application program A displays users corresponding to the user identifying information returned from the social graph display program (API) 23 as candidates of the friend request (S24). The user selects the user displayed to make the friend request among the users displayed as the candidates of the friend request in the application program A (S25). Thereby, the friend request is made. The user B is assumed to be selected in this description.

When the friend request is made, the social graph display program (API) 23 notifies the user B of the fact that the friend request has been made via the application program A. The user B approves the friend request from the user A in the application program A (Step B-2).

When the request is approved, the user A establishes a friend relationship with the user B and the user B establishes a friend relationship with the user A in the application program A (Steps A-3, B-3). Specifically, the application program A adds "friend with the user B" to the social graph information of the user A, and adds "friend with the user A" to the social graph information of the user B.

Next, a case of inviting a friend will be described.

The user B starts the application program B (Step A-4). Next, the user A makes an invitation to the user B in the application program B (Step A-5).

Figure 8:
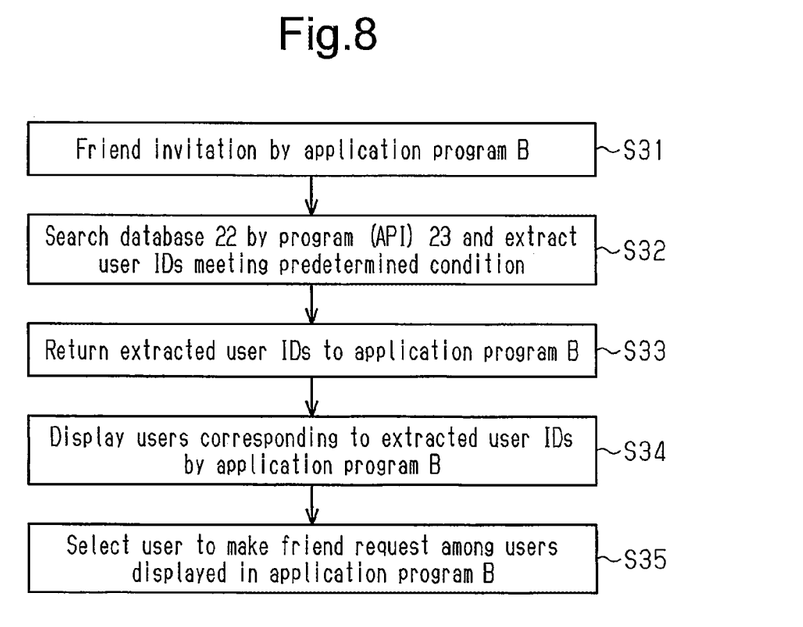
FIG. 8 is a flowchart for illustrating processing by the social graph display program (API) 23 and an application program B in a case of making a friend invitation.

In a case where the friend invitation is made, processing shown in FIG. 8 is performed by the social graph display program (API) 23 and the application program B.

That is, when a friend invitation is made by the application program B (S31), the social graph display program (API) 23 searches the social graph information database 22 of the application programs A to C based on the identifying information of the user A, who made the friend request, retrieves the social graph information meeting a predetermined condition, and extracts the user identifying information of the retrieved social graph information (S32).

The "predetermined condition" is, for example, to sort and extract the friends of other application programs in the order of a high matching rate (indicating in how many application programs a certain friend exists).

In a case where a friend invitation is made based on the relationship value information, the relationship value information stored in the database 22 of each of the application programs is combined for each user and normalized. Then, based on this normalized relationship value information, highly related users having the relationship value information meeting the predetermined condition are retrieved.

Next, the social graph display program (API) 23 returns the extracted user identifying information to the application program B (S33), and the application program B displays users corresponding to the user identifying information returned from the social graph display program (API) 23 as candidates of the friend invitation (S34). The user selects a user to make a friend invitation among the users displayed as the candidates of the friend invitation in the application program B (S35). Thereby, the friend invitation is made. The user B is assumed to be selected in this description.

Figure 11:
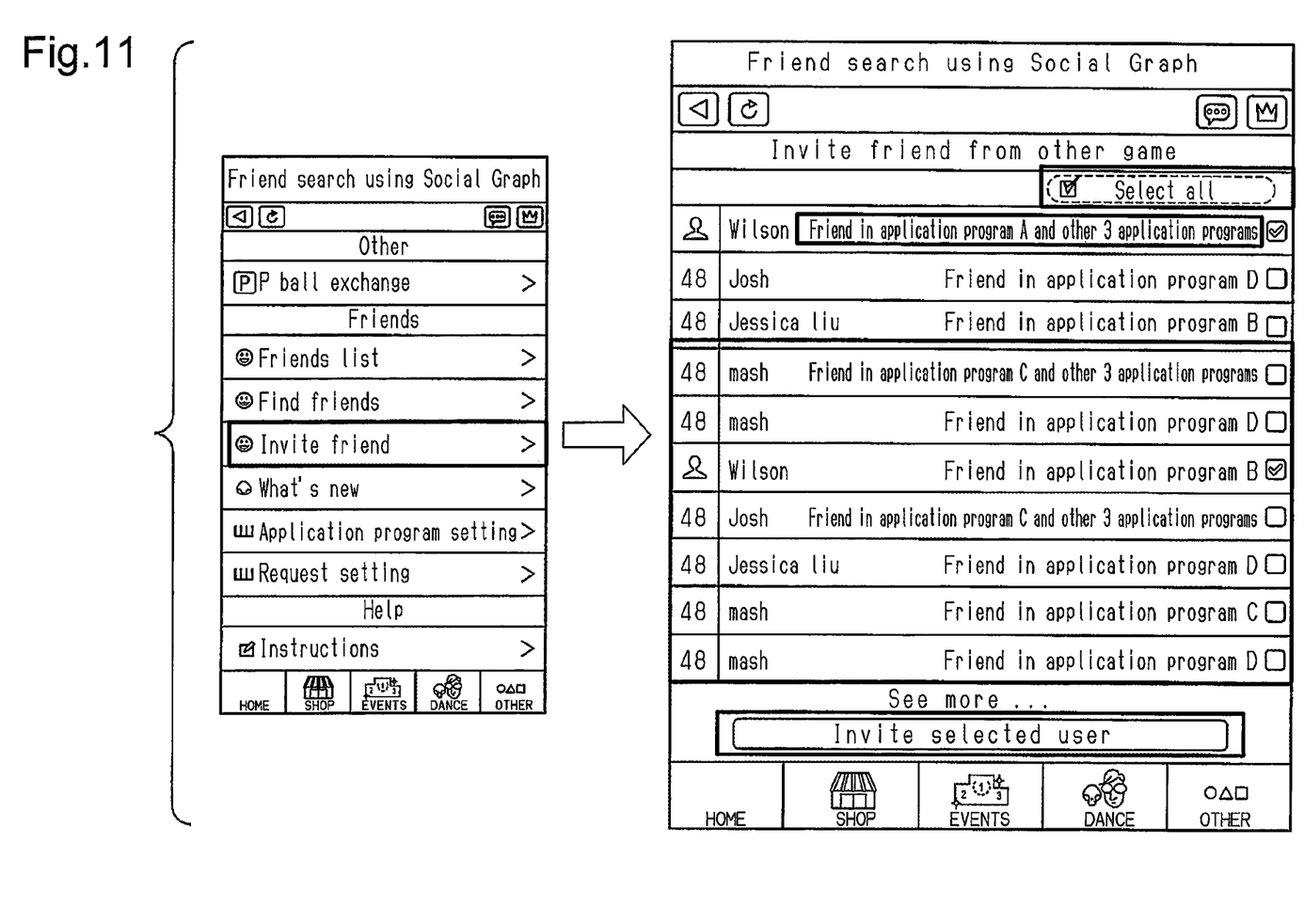
FIG. 11 is a diagram showing one example of a view of the friend invitation.

FIG. 11 is a diagram showing one example of a view of the friend invitation. As shown in the drawing, friends in other application programs are displayed. This display is displayed in order of highly related users based on predetermined criteria such as the above matching rate or the relationship value information. When a friend invitation is made, the social graph display program (API) 23 notifies the user B of the fact that the friend invitation has been made via the application program B. The user B approves the friend invitation from the user A in the application program B (Step B-4).

When the invitation is approved, the user A establishes a friend relationship with the user B and the user B establishes a friend relationship with the user A in the application program B (Steps A-6, B-5). Specifically, the application program B adds "friend with the user B" to the user-to-user relationship information of the user A, and adds "friend with the user A" to the user-to-user relationship information of the user B.

Figure 9:
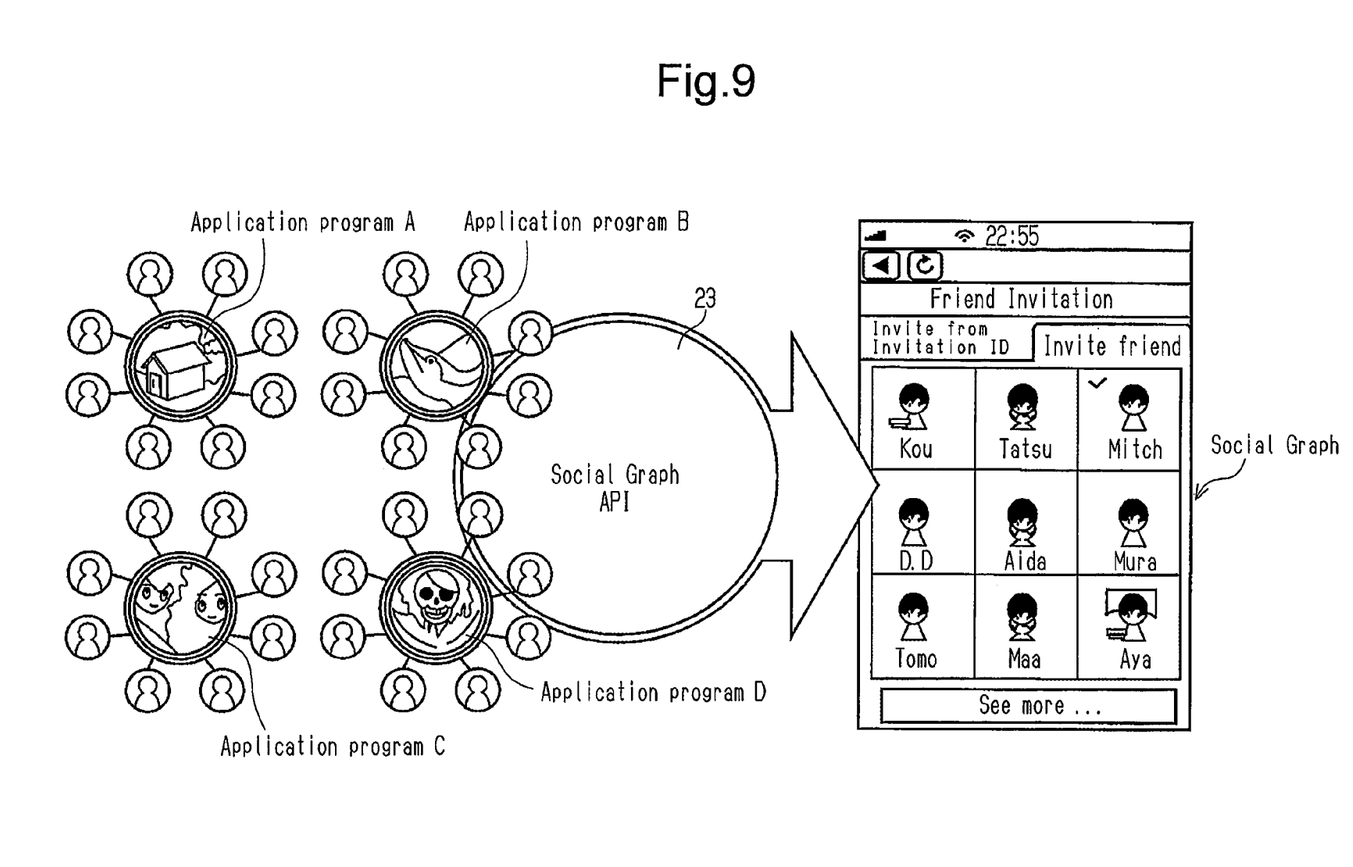
FIG. 9 is a diagram for illustrating an image of the social graph display system according to the present embodiment.

FIG. 9 is a diagram for illustrating an image of the social graph display system according to the present embodiment. As shown in the drawing, users respectively exist in the application programs A to D. In a case of making a friend invitation, based on the social graph information managed for each of the application programs A to D, the user identifying information is retrieved and extracted based on a predetermined condition, and the characters of users corresponding to the user identifying information extracted as candidates of the friend invitation are displayed as a social graph. On the right side of FIG. 9, one example of the social graph displayed on the terminal is shown. The display method is not limited to this.

In addition, FIG. 11 shows a case of inviting a friend. However, the user may be invited based on other social information. In the above embodiment, a case where the user is retrieved based on the user-to-user relationship information or the relationship value information is described. However, the user may be retrieved based on the user information.

Figure 12:
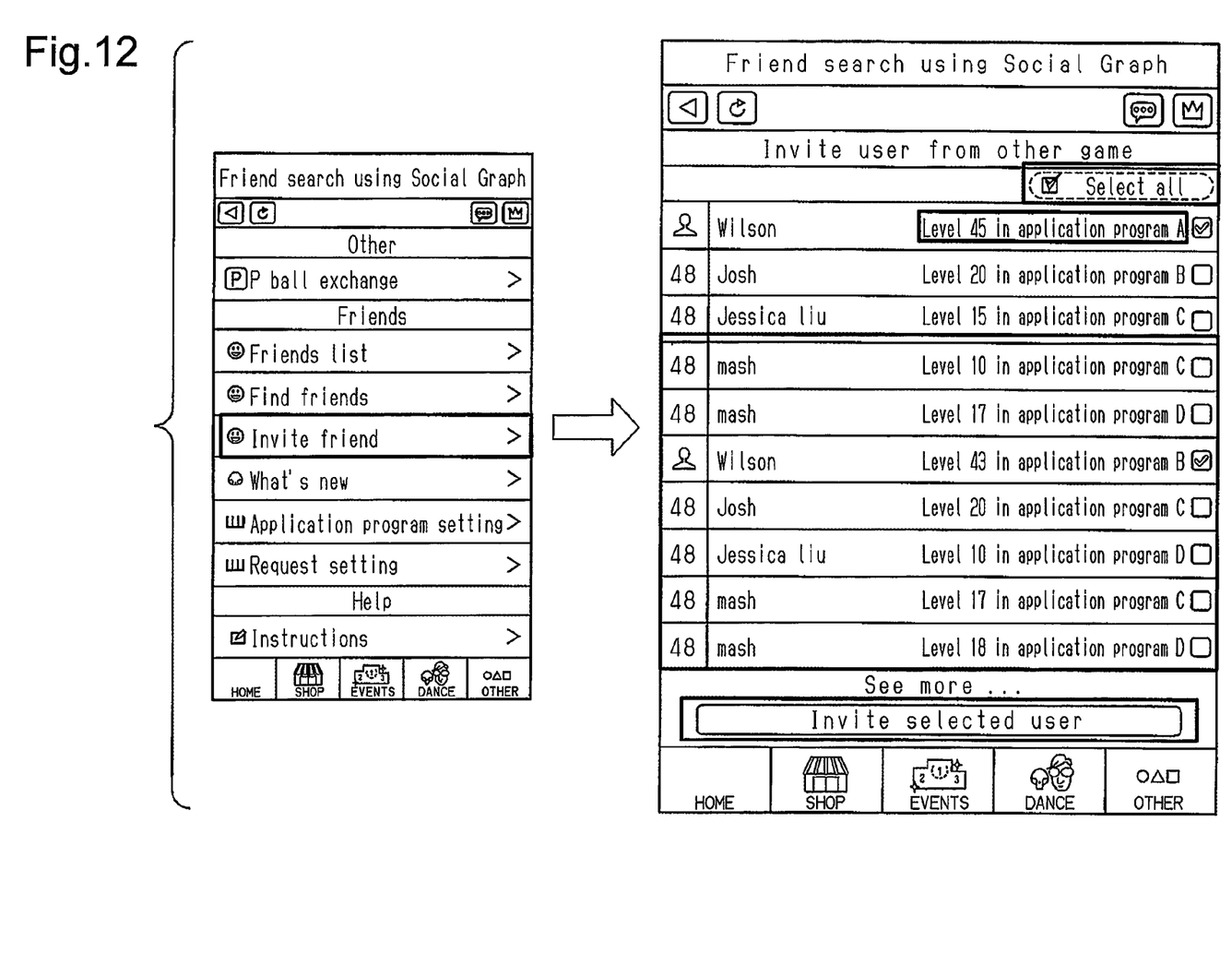
FIG. 12 is a diagram showing one example of a view in a case of retrieving other users with a user level (user information) of the program.
Figure 13:
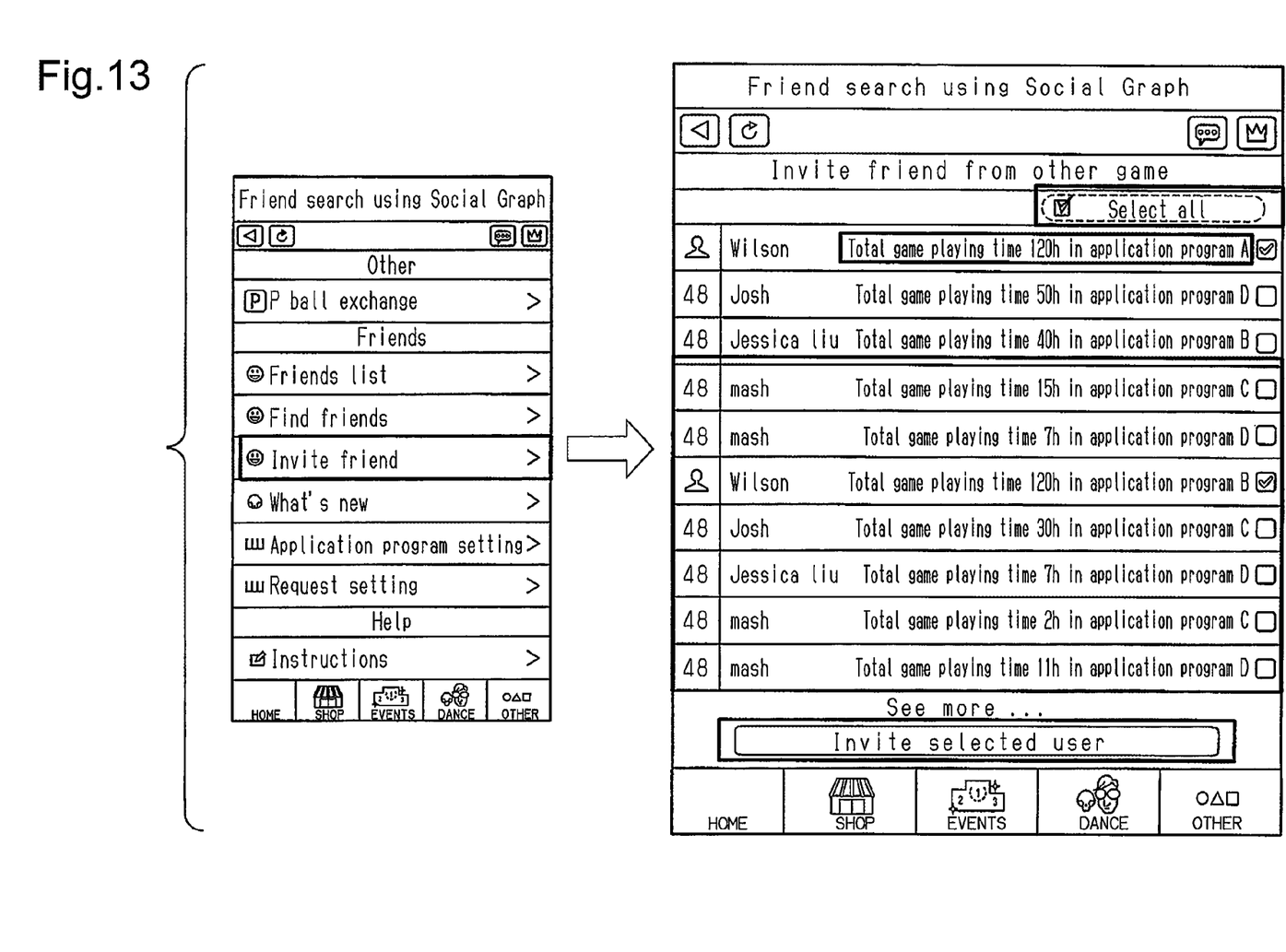
FIG. 13 is a diagram showing one example of a view in a case of retrieving other users with a total game playing time (user information) of the program.

FIG. 12 is a diagram showing one example of a view in a case of retrieving other users with a user level (user information) of the program. FIG. 13 is a diagram showing one example of a view in a case of retrieving other users with a total game playing time (user information) of the program.

Therefore, according to the present embodiment, the user can be retrieved through the application programs based on the user-to-user relationship information or the user information, and the social graph can be displayed. Thus, the CVR of the application programs can be improved.

The relationship value information can be weighed for each application program. Thus, at the discretion of a system administrator, the CVR of the application programs can be more finely controlled.

In addition, although only the friend invitation has been described for purposes of illustration, the present invention is not limited to this. For example, in a case of a game system of a strategy game and the like, cooperation in battles is considered. In this case, an invitation of a friend whose cooperation is desired and the like are included.

Several embodiments of the present invention have been described. However, these embodiments are provided as examples with no intention to limit the scope of the invention. These novel embodiments can be implemented in various other modes, and various omissions, replacements, and changes can be made within the range not departing from the gist of the invention. These embodiments and modifications thereof are included in the scope and the gist of the invention and included in the invention described in the claims and the range of equivalents.

Also, the method described in the embodiments can be stored in a recording medium such as a magnetic disk (Floppy (Registered Trademark) disk, hard disk, and the like), an optical disc (CD-ROM, DVD, MO, and the like), and a semiconductor memory (ROM, RAM, flash memory, and the like) as a program that can be executed by a computing machine (computer), or can be transferred and distributed by a communication medium. In addition, the program to be stored on the medium also includes a setting program for configuring a software means (including not only execution programs but also tables and data structures) to be executed by and in the computing machine. The computing machine for realizing the device reads the program recorded in the recording medium, or constructs the software means by the setting program according to circumstances and executes the above processing by controlling operations with this software means. In addition, the recording medium described in the present specification includes not only the one for distribution but also a storage medium provided inside the computing machine or in a device connected via a network such as a magnetic disk and a semiconductor memory.

DESCRIPTION OF THE REFERENCE NUMERALS

1 . . . Network, 2 . . . Server group, 3 . . . Computer, 4 . . . Mobile phone, 5 . . . Access point (AP), 6 . . . Base station, 21 . . . Operating system, 22 . . . Social graph information database, 23 . . . Social graph display program (API)

The invention claimed is:

1. A system comprising:
a storage device storing relational information for each of a plurality of application programs on an application program basis, the plurality of application programs including a first application program and a second application program that is different from the first application program, the relational information managing a plurality of user identifiers (IDs) of a plurality of users, first information related to use of an application program of the plurality of application programs, and second information indicating a relationship between a user identified by a user ID and at least one other user of the plurality of users; and
circuitry configured to
establish a first friend relationship between a first user and a second user among the plurality of users in the second application program, based on the relational information corresponding to the second application program; and
in response to a request by the first user from the first application program of the plurality of application programs,
extract at least one user ID of at least one user from the plurality of users, in which the at least one user has established the first friend relationship with the first user in the second application program,
output the extracted at least one user ID to the first application program, and
display, on a client terminal of the first user, information corresponding to at least one of the extracted at least one user ID together with at least one of the first information and the second information for the at least one of the extracted at least one user ID, wherein
a friend relationship is established between two users among the plurality of users for each application program of the plurality of application programs, separately.

2. The system according to claim 1, wherein the second information includes information indicating that the user corresponding the user ID has established the first friend relationship with the first user, and the circuitry is configured to display, on the client terminal of the first user, information corresponding to the at least one of the extracted at least one user ID for user selection together with at least the second information for the at least one of the extracted at least one user ID.

3. The system according to claim 1, wherein the circuitry is configured to:
receive, from the client terminal of the first user, a request to establish a second friend relationship between the first user and one or more second users corresponding to at least one of the extracted at least one user ID in the first application program;
transmit, to each second client terminal of the one or more second users, an invitation to establish the second friend relationship between the first user and the second user in the first application program based on the request;
receive, from the second client terminal, a response to the invitation; and
establish, based on the response, the second friend relationship between the first user and the second user in the first application program.

4. The system according to claim 1, wherein the circuitry is configured to extract at least one user ID by executing an API program of the plurality of application programs.

5. The system according to claim 1, wherein the circuitry is configured to combine and normalize relationship value information regarding the application programs for each user of the plurality of users, and
extract user ID of at least one user meeting a predetermined condition based on the normalized relationship value information included in the relational information.

6. A method performed by a system including a storage device storing relational information for each of a plurality of application programs on an application program basis, the plurality of application programs including a first application program and a second application program that is different from the first application program, the relational information managing a plurality of user identifiers (IDs) of a plurality of users, first information related to use of an application program of the plurality of application programs, and second information indicating a relationship between a user identified by a user ID and at least one other user of the plurality of users, the method comprising:
establishing a first friend relationship between a first user and a second user among the plurality of users in the second application program, based on the relational information corresponding to the second application program; and
in response to a request by the first user from the first application program of the plurality of application programs,
extracting at least one user ID of at least one user from the plurality of users, in which the at least one user has established the first friend relationship with the first user in the second application program, outputting the extracted at least one user ID to the first application program, and
displaying, on a client terminal of the first user, information corresponding to at least one of the extracted at least one user ID together with at least one of the first information and the second information for the at least one of the extracted at least one user ID, wherein a friend relationship is established between two users among the plurality of users for each application program of the plurality of application programs, separately.

7. The method according to claim 6, wherein
the second information includes information indicating that the user corresponding the user ID has established the first friend relationship with the first user, and
the displaying includes displaying, on the client terminal of the first user, information corresponding to the at least one of the extracted at least one user ID for user selection together with at least the second information for the at least one of the extracted at least one user ID.

8. The method according to claim 6, further comprising:
receiving, from the client terminal of the first user, a request to establish a second friend relationship between the first user and one or more second users corresponding to at least one of the extracted at least one user ID in the first application program;
transmitting, to each second client terminal of the one or more second users, an invitation to establish the second friend relationship between the first user and the second user in the first application program based on the request;
receiving, from the second client terminal, a response to the invitation; and
establishing, based on the response, the second friend relationship between the first user and the second user in the first application program.

9. The method according to claim 6, wherein extracting at least one user ID includes executing an API program of the plurality of application programs.

10. The method according to claim 6, further comprising:
combining and normalizing relationship value information regarding the application programs for each user of the plurality of users, and
extracting user ID of at least one user meeting a predetermined condition based on the normalized relationship value information included in the relational information.

11. A non-transitory computer readable medium including a program, which when executed by a system including a storage device storing relational information for each of a plurality of application programs on an application program basis, the plurality of application programs including a first application program and a second application program that is different from the first application program, the relational information managing a plurality of user identifiers (IDs) of a plurality of users, first information related to use of an application program of the plurality of application programs, and second information indicating a relationship between a user identified by a user ID and at least one other user of the plurality of users causes the system to:
establish a first friend relationship between a first user and a second user among the plurality of users in the second application program, based on the relational information corresponding to the second application program; and
in response to a request by the first user from the first application program of the plurality of application programs,
extract at least one user ID of at least one user from the plurality of users, in which the at least one user has established the first friend relationship with the first user in the second application program,
output the extracted at least one user ID to the first application program, and display, on a client terminal of the first user, information corresponding to at least one of the extracted at least one user ID together with at least one of the first information and the second information for the at least one of the extracted at least one user ID, wherein a friend relationship is established between two users among the plurality of users for each application program of the plurality of application programs, separately.

12. The non-transitory computer readable medium according to claim 11, wherein the second information includes information indicating that the user corresponding the user ID has established the first friend relationship with the first user, and the program, when executed by the system, causes the system to display, on the client terminal of the first user, information corresponding to the at least one of the extracted at least one user ID for user selection together with at least the second information for the at least one of the extracted at least one user ID.

13. The non-transitory computer readable medium according to claim 11, wherein the program, when executed by the system, causes the system to:

receive, from the client terminal of the first user, a request to establish a second friend relationship between the first user and one or more second users corresponding to at least one of the extracted at least one user ID in the first application program;

transmit, to each second client terminal of the one or more second users, an invitation to establish the second friend relationship between the first user and the second user in the first application program based on the request;

receive, from the second client terminal, a response to the invitation; and establish, based on the response, the second friend relationship between the first user and the second user in the first application program.

14. The non-transitory computer readable medium according to claim 11, wherein the program, when executed by the system, causes the system to extract at least one user ID by executing an API program of the plurality of application programs.

15. The non-transitory computer readable medium according to claim 11, wherein the program, when executed by the system, causes the system to:

combine and normalize relationship value information regarding the application programs for each user of the plurality of users, and extract user ID of at least one user meeting a predetermined condition based on the normalized relationship value information included in the relational information.

* * * * *